United States Patent
Kolla et al.

(10) Patent No.: US 12,503,178 B2
(45) Date of Patent: Dec. 23, 2025

(54) SPARE WHEEL CARRIER WITH A ROTATABLE LATCH FOR ROTATING THE SPARE WHEEL

(71) Applicant: Volvo Truck Corporation, Gothenburg (SE)

(72) Inventors: Kamal Kolla, Bangalore (IN); Rakesh Lohar, Dewas (IN); Prabandhana Kalita, Bangalore (IN)

(73) Assignee: Volvo Truck Corporation, Gothenburg (SE)

( * ) Notice: Subject to any disclaimer, the term of this patent is extended or adjusted under 35 U.S.C. 154(b) by 127 days.

(21) Appl. No.: 18/564,249

(22) PCT Filed: Jun. 25, 2021

(86) PCT No.: PCT/EP2021/067491
§ 371 (c)(1),
(2) Date: Nov. 27, 2023

(87) PCT Pub. No.: WO2022/268336
PCT Pub. Date: Dec. 29, 2022

(65) Prior Publication Data
US 2024/0270329 A1   Aug. 15, 2024

(51) Int. Cl.
*B62D 43/04* (2006.01)
*B62D 43/00* (2006.01)

(52) U.S. Cl.
CPC ......... *B62D 43/045* (2013.01); *B62D 43/002* (2013.01); *B62D 43/04* (2013.01)

(58) Field of Classification Search
CPC .............................. B62D 43/02; B62D 43/04
(Continued)

(56) References Cited

U.S. PATENT DOCUMENTS

| 1,808,042 A | * | 6/1931 | Kennedy | ................... B60R 9/06 |
| | | | | 224/508 |
| 1,846,544 A | * | 2/1932 | Coquille | ................. B60R 9/065 |
| | | | | 224/42.21 |

(Continued)

FOREIGN PATENT DOCUMENTS

| CN | 108128358 A | 6/2018 |
| DE | 2757657 A1 | 6/1979 |

(Continued)

OTHER PUBLICATIONS

International Search Report and Written Opinion for International Patent Application No. PCT/EP2021/067491, mailed Mar. 30, 2022, 11 pages.

*Primary Examiner* — Justin M Larson
(74) *Attorney, Agent, or Firm* — Withrow & Terranova, PLLC (57) ABSTRACT

A spare wheel carrier intended to be mounted on a motor vehicle comprising a chassis for storing a spare wheel, the spare wheel carrier comprising a mounting bracket intended to be mounted on the chassis of the motor vehicle; a latch mounted on the mounting bracket, the spare wheel being intended to be attached to the latch, wherein the latch is movable, with at least a rotation movement relative to the mounting bracket, between a storage position in which the spare wheel is intended to extend in a horizontal plane, in a horizontal position and a release position in which the spare wheel is intended to extend in a vertical plane perpendicular to the horizontal plane, in a vertical position perpendicular to the horizontal position.

14 Claims, 5 Drawing Sheets

(58) Field of Classification Search
USPC .................. 224/24.21, 24.23; 414/465, 466
See application file for complete search history.

(56) References Cited

U.S. PATENT DOCUMENTS

| | | | | |
|---|---|---|---|---|
| 1,866,013 A * | 7/1932 | Coquille | ................ | B62D 43/02 |
| | | | | 224/42.21 |
| 1,877,887 A * | 9/1932 | Fulton | ................... | B62D 43/02 |
| | | | | 224/535 |
| 1,974,599 A * | 9/1934 | Bradford | ............... | B62D 43/02 |
| | | | | 224/42.21 |
| 2,049,681 A * | 8/1936 | Arndt | .................... | B62D 43/02 |
| | | | | 224/42.21 |
| 2,348,811 A | 5/1944 | Hartman | | |
| 2,354,943 A * | 8/1944 | Clark | ................... | B62D 43/002 |
| | | | | 414/463 |
| 2,378,911 A * | 6/1945 | Clark | ................ | B62D 53/0857 |
| | | | | 414/465 |
| 2,399,207 A * | 4/1946 | Clark | ................... | B62D 43/002 |
| | | | | 414/465 |
| 2,489,561 A * | 11/1949 | Clark | ................... | B62D 43/002 |
| | | | | 414/465 |
| 2,765,091 A * | 10/1956 | Weiss | ................... | B62D 43/002 |
| | | | | 414/466 |
| 2,819,004 A * | 1/1958 | Kubik | ................... | B62D 43/02 |
| | | | | 224/42.21 |
| 3,448,904 A * | 6/1969 | Sahr | ....................... | B60N 3/001 |
| | | | | 414/466 |
| 3,613,971 A * | 10/1971 | Betz | ....................... | B62D 43/02 |
| | | | | 224/42.21 |
| 3,847,427 A * | 11/1974 | Eshelman | ............... | B60R 19/20 |
| | | | | 293/118 |
| 4,212,417 A * | 7/1980 | Scott | ...................... | B62D 43/08 |
| | | | | 414/466 |
| 4,418,851 A * | 12/1983 | Ankeny | ................. | B62D 43/02 |
| | | | | 414/463 |
| 4,483,468 A * | 11/1984 | Lucas | ................... | B62D 43/02 |
| | | | | 224/512 |
| 4,884,729 A * | 12/1989 | Barkouskie | ........... | B62D 43/04 |
| | | | | 414/466 |
| 5,730,338 A * | 3/1998 | Travis | .................... | B62D 43/02 |
| | | | | 224/42.32 |
| 5,957,346 A * | 9/1999 | Schambre | ........... | B62D 43/002 |
| | | | | 414/466 |
| 6,918,520 B2 * | 7/2005 | Skinner | .................. | B62D 43/02 |
| | | | | 224/42.21 |
| 2017/0240227 A1* | 8/2017 | Lorusso | ............ | B62D 33/0207 |
| 2024/0270329 A1* | 8/2024 | Kolla | .................... | B62D 43/04 |

FOREIGN PATENT DOCUMENTS

EP          2199191 A1    6/2010
KR    20040073005 A    8/2004

* cited by examiner

SPARE WHEEL CARRIER WITH A ROTATABLE LATCH FOR ROTATING THE SPARE WHEEL

This application is a 35 USC 371 national phase filing of International Application No. PCT/EP2021/067491, filed Jun. 25, 2021, the disclosure of which is incorporated herein by reference in its entirety.

TECHNICAL FIELD

This disclosure pertains to the field of spare wheel carriers of motor vehicles. In particular, the disclosure relates to a spare wheel carrier with a rotatable latch for rotating the spare wheel. The disclosure also relates to a motor vehicle comprising the spare wheel carrier, and to a method for releasing the spare wheel from the motor vehicle.

BACKGROUND ART

Occasionally, one of the wheels of a motor vehicle may be punctured. In order for the vehicle to travel safely, the punctured wheel must be replaced. Today, many vehicles are equipped with a spare wheel attached to the vehicle, which can be used to replace the punctured wheel.

To replace the punctured wheel by the spare wheel, the operator has to access to the spare wheel, and to detach it from the vehicle. Then, the operator has to remove the punctured wheel and to fix the spare wheel at the former place of the punctured wheel.

However, the spare wheel is sometimes difficult to access and the current mechanisms used to attach the spare wheel to the vehicle are complex. The operator thus needs time to detach the spare wheel from the vehicle. Moreover, the operator has to provide an important physical strength to detach the spare wheel and to drag and lift the spare wheel to its new place.

The U.S. Pat. No. 4,884,729 proposes a spare tire rack holding a spare tire enabling to move the spare tire from a storage position, under the vehicle, below the bumper to a release position beyond the bumper for improving the access to the spare tire.

However, when the spare tire is in the release position, the spare tire lies on the ground. The operator still has to provide significant strength to lift the spare tire and to drag the spare tire. The wheel change is therefore particularly physical for the operator, and the time for changing the spare tire thus remains long.

Therefore, a need exists for a system that enables the operator to provide a reduced physical strength to fit the spare wheel and reduces the time required to replace a punctured wheel with a spare wheel on a vehicle.

SUMMARY

It is proposed, according to a first aspect, a spare wheel carrier intended to be mounted on a motor vehicle comprising a chassis for storing a spare wheel, the spare wheel carrier comprising:
  a mounting bracket intended to be mounted on the chassis of the motor vehicle;
  a latch mounted on the mounting bracket, the spare wheel being intended to be attached to the latch;
wherein the latch is movable, with at least a rotation movement relative to the mounting bracket, between a storage position in which the spare wheel is intended to extend in a horizontal plane, in a horizontal position and a release position in which the spare wheel is intended to extend in a vertical plane perpendicular to the horizontal plane, in a vertical position perpendicular to the horizontal position.

The movable latch enables to rotate the spare wheel. In other words, the latch supports the rotation of the spare wheel. Thus, the operator does not need to provide physical strength to rotate the spare wheel.

Moreover, when the latch is in the release position, the spare wheel extends in a vertical position, namely the rotational axis of the spare wheel extends parallel to the ground on which the vehicle is positioned. The operator can then easily grab the spare wheel and can roll the spare wheel to its new position corresponding to the position of the punctured wheel, for replacing the punctured wheel. The operator does not need to lift the spare wheel to position it to the new position.

Besides, as the spare wheel carrier according to the disclosure avoid the need for the operator to provide strength to release the spare wheel and position the spare wheel to the new position, the operator can also change the punctured wheel quickly.

The following features, can be optionally implemented, separately or in combination one with the others.

According to one aspect, the mounting bracket comprises a planar mounting surface through which the mounting bracket is intended to be mounted on the chassis and extending in an attaching plane, the vertical plane being parallel to the attaching plane.

According to one aspect, the latch is movable with a vertical translation movement relative to the mounting bracket between the storage position and the release position, the vertical translation movement extending in a plane parallel to the vertical plane.

The latch can thus be both rotated and vertically translated relative to the mounting bracket. The movement of the latch and the spare wheel from the storage position to the release position can thus be facilitated.

According to one aspect, one of the mounting bracket and the latch comprises at least one first pin and the other one of the mounting bracket and the latch comprises at least one first groove in which the first pin is slidably engaged, the first groove defining a first path intended to be followed by the first pin to guide the latch when the latch is moved between the storage position and the release position.

The movement of the latch is thus supported by the cooperation of the first pin and the first groove.

For example, the mounting bracket comprises said at least one first pin and the latch comprises said at least one first groove.

According to one aspect, said at least one first groove comprises a straight part vertically extending when the latch is in the storage position, and a circular part extending along a circular arc, and said at least one first pin comprises a main pin, said main pin being engaged in the straight part of the first groove when the latch is in the storage position, and in the circular part of the first groove when the latch is in the release position.

According to one aspect, said at least one first pin comprises an additional pin, said additional pin being engaged in the straight part of the first groove and being arranged to move in the straight part of the first groove when the latch is moved between the storage position and the release position.

According to one aspect, the main pin and the additional pin are vertically spaced from a reference distance, and the circular arc has a radius equal to the reference distance.

According to one aspect, said at least first groove comprises at least a recess for locking at least one of said at least one first pin when the latch is in the storage position or in the release position.

According to one aspect, the mounting bracket comprises a first lateral side and a second lateral side, the first lateral side and the second lateral side being parallel to each other and each having an inner face facing each other, and the latch is disposed between the inner faces and comprises a first lateral arm, a second lateral arm parallel to each other and a transversal support joining the first lateral arm and the second lateral arm, the first lateral arm facing the inner face of the first lateral side, the second lateral arm facing the inner face of the second lateral side, and the spare wheel being attached to the transversal support, and one of the inner face of the first lateral side and the first lateral arm comprises said at least one first pin, and the other one of the inner face of the first lateral side and the first lateral arm comprises said at least one first groove, and one of the inner face of the second lateral side and the second lateral arm comprises at least one second pin, and the other one of the inner face of the second lateral side and the second lateral arm comprises at least one second groove in which the second pin is slidably engaged, the second groove defining a second path intended to be followed by the second pin to guide the latch when the latch is moved between the storage position and the release position.

For example, the inner face of the second lateral side of the mounting bracket comprises said at least one second pin and the second lateral arm of the latch comprises said at least one second groove.

According to one aspect, said at least one second groove is formed by a straight part vertically extending when the latch is in the storage position, and said at least one second pin comprises a primary pin, said primary pin being engaged in the straight part of the second groove when the latch is in the storage position and when the latch is in the release position.

In one example, said at least one second pin comprises a single pin formed by the primary pin.

According to one aspect, the transversal support comprises an extension having a hole configured to attach the spare wheel.

According to one aspect, the spare wheel carrier comprises a securing holder having a fastener part attached to the mounting bracket,
a chain having a first extremity attached to the fastener part and a second extremity opposed to the first extremity, and
an attachment part attached to the second extremity of the chain, the attachment part being intended to be attached to the mounting bracket by enclosing the spare wheel between said attachment part and the mounting bracket when the latch is in the storage position to bind the spare wheel to the mounting bracket.

According to a second aspect, it is proposed a motor vehicle comprising a chassis,
a spare wheel,
a spare wheel carrier according to the first aspect,
wherein the mounting bracket is mounted on the chassis, and the spare wheel is attached to the latch, and wherein the spare wheel extends in the horizontal plane, in the horizontal position, when the latch is in the storage position and the spare wheel extends in the vertical plane, in the vertical position, when the latch is in the release position.

According to one aspect, the mounting bracket is attached to an external side of the chassis.

According to a third aspect, it is proposed a method for releasing a spare wheel from a motor vehicle according to the second aspect, the method comprising grab the spare wheel in the horizontal position,
rotate the latch relative to the mounting bracket from the storage position to the release position, so as to swivel the spare wheel from the horizontal position to the vertical position,
release the spare wheel in the vertical position.

According to one aspect, the method comprises:
detach the attachment part from the mounting bracket to unbind the spare wheel and the securing part prior to grab the spare wheel in the horizontal position
remove the attachment part from the spare wheel before releasing the spare wheel.

BRIEF DESCRIPTION OF DRAWINGS

Other features, details and advantages will be shown in the following detailed description and on the figures, on which.

DESCRIPTION OF EMBODIMENTS

In the figures, the same references denote identical or similar elements. For sake of clarity, various elements may not be represented at scale.

In the description, the longitudinal direction L is defined as the direction from the rear to the front of the vehicle when considering the normal direction of travel of the vehicle, the transverse direction T is defined as the direction perpendicular to the longitudinal direction and from one side of the vehicle to the other, and the vertical direction V is defined from bottom to top, as the direction perpendicular to the longitudinal direction and to the transverse direction.

Figure 1:
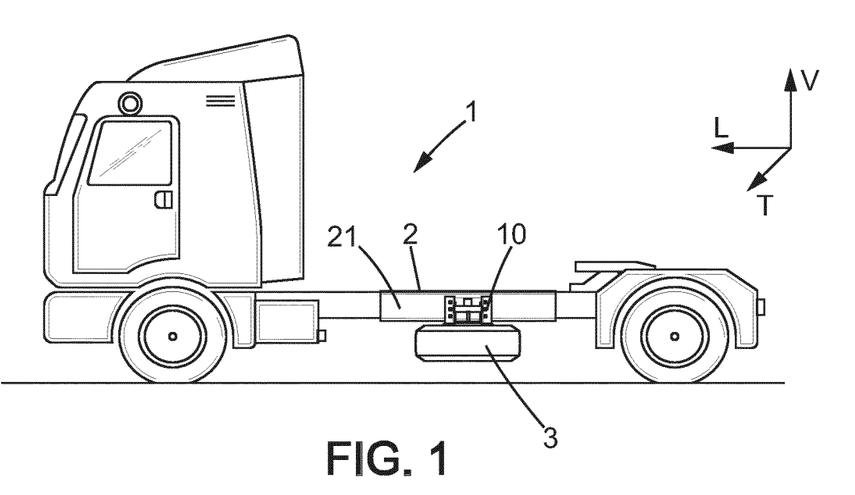
FIG. 1 shows a truck comprising a spare wheel carrier mounted on the truck and storing a spare wheel in a horizontal position.
Figure 2:
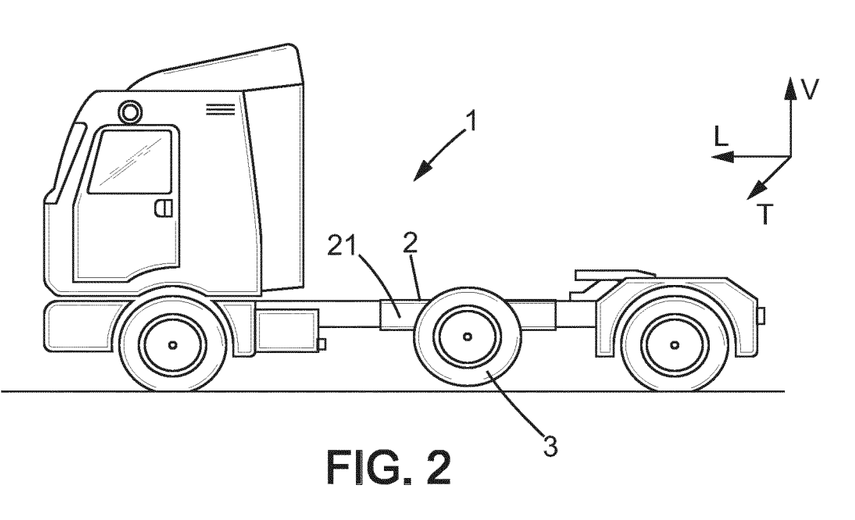
FIG. 2 shows the truck shown on FIG. 1 wherein the spare wheel has been moved to a vertical position.

FIGS. 1 and 2 show a truck 1 comprising a chassis 2, a spare wheel carrier 10 attached to an external side 21 of the chassis 2, and a spare wheel 3 attached to the spare wheel carrier 3. The external side 21 of the chassis 2 delimits a transversal extremity of the chassis 2.

Although the description presents a truck 1 as a motor vehicle, it is understood that the disclosure applies to any type of vehicle such as a car, a bus, a heavy-duty vehicle or any other ground vehicle.

As it will be further detailed below, the spare wheel carrier 10 comprises a latch 120 movable between a storage position and a release position.

On FIG. 1, the latch 120 of the spare wheel carrier 10 is in the storage position. In this storage position, the spare wheel 3 extends in a horizontal plane, in a horizontal position. The horizontal plane is defined as being parallel to a plane comprising the longitudinal direction L and the transverse direction T. As long as no wheels of the truck 1 needs to be replaced, the truck 1 runs with the spare wheel 3 in this horizontal position.

On FIG. 2, the latch 120 of the spare wheel carrier 10 is in the release position. In this release position, the spare wheel 3 extends in a vertical plane, in a vertical position. The vertical plane is defines as being parallel to a plane comprising the longitudinal direction L and the vertical direction V. The vertical plane and the horizontal plane are thus perpendicular, and consequently, the horizontal position and the vertical position of the spare wheel 3 are perpendicular. In this vertical position, the spare wheel 3 is in position to be grabbed by an operator and to be detached from the spare wheel carrier 10 to replace a punctured wheel by the spare wheel 3.

Figure 3:
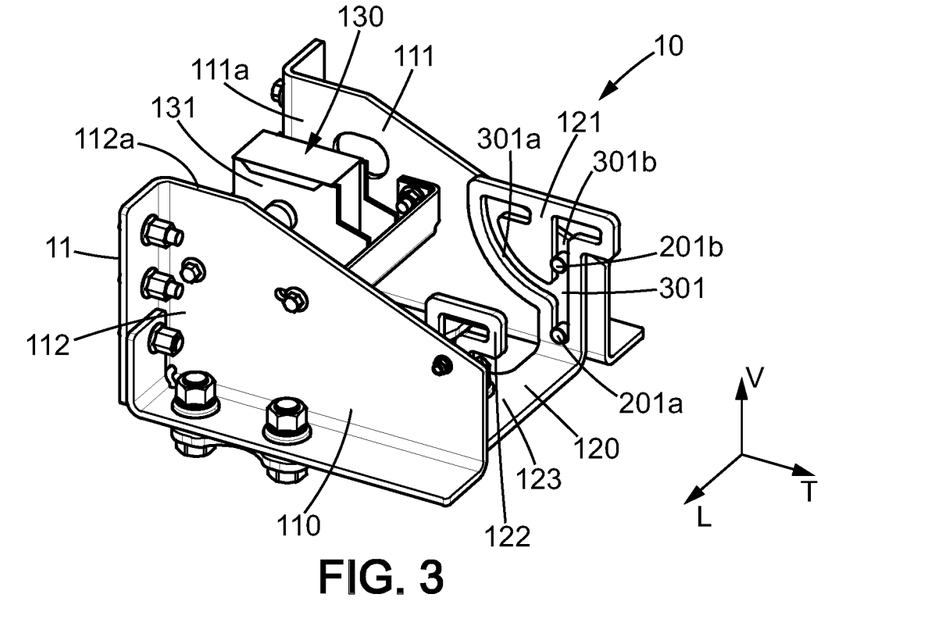
FIG. 3 shows the spare wheel carrier of the truck shown on FIG. 1 from a lateral viewing angle, the spare wheel carrier comprising a mounting bracket with pins, a latch mounted on the mounting bracket, and with grooves in which the pins are slidably engaged, and an attachment part.
Figure 4:
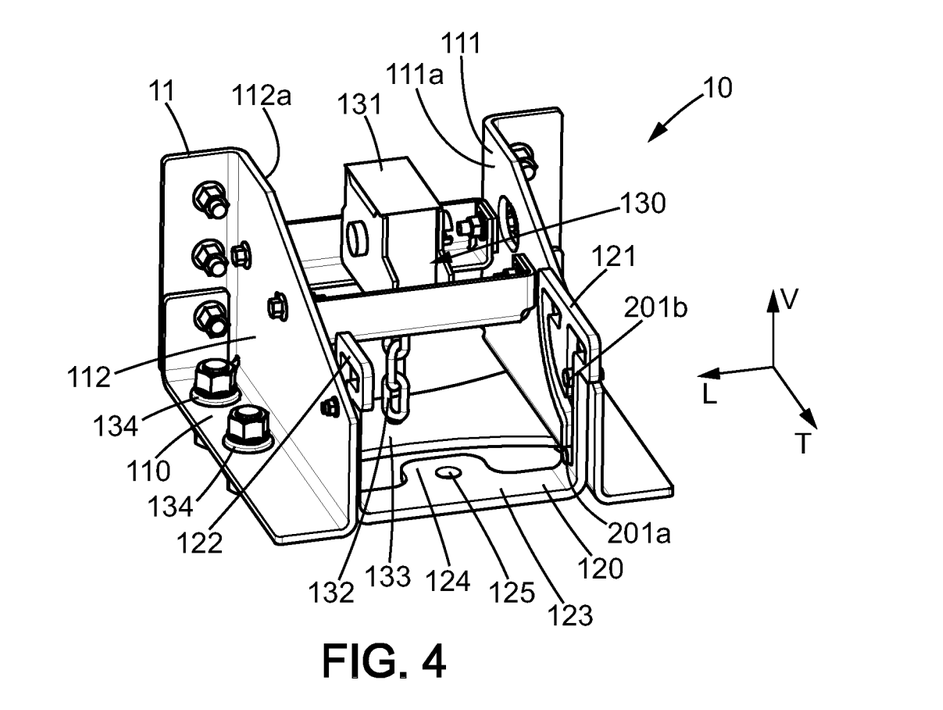
FIG. 4 shows the spare wheel carrier shown on FIG. 3 from a front viewing angle.

The spare wheel carrier 10 is further detailed on FIGS. 3 and 4. The spare wheel carrier 10 comprises a mounting bracket 110 on which is mounted the latch 120. The mounting bracket 110 comprises a planar mounting surface 11 through which the mounting bracket 110 is mounted on the chassis 2 of the truck 1. The planar mounting surface 11 extends in an attaching plane which is parallel to the vertical plane. The spare wheel carrier 10 is thus attached to the truck 1 through the mounting bracket 110.

The mounting bracket 110 comprises a first lateral side 111 and a second lateral side 112. The first lateral side 111 and the second lateral side 112 are parallel to each other and each have an inner face 111a, 112a. The inner faces 111a, 112a are facing each other.

The latch 120 comprises a first lateral arm 121 and a second lateral arm 122 parallel to each other, and a transversal support 123 joining the first lateral arm 121 and the second lateral arm 122. The transversal support 123 comprises an extension 124 having a hole 125.

The first lateral arm 121 faces the inner face 111a of the first lateral side 111 and the second lateral arm 122 faces the inner face 112a of the second lateral side 112. The latch 120 is thus disposed between the inner faces 111a, 112a of the first lateral side 111 and the second lateral side 112 of the mounting bracket 110.

The inner face 111a of the first lateral side 111 of the mounting bracket 110 comprises two first pins 201a, 201b, namely a main pin 201a and an additional pin 201b. The main pin 201a and the additional pin 201b are vertically spaced from a reference distance d. The inner face 112a of the second lateral side 112 of the mounting bracket 110 comprises a second pin 202. In this example, the inner face 112a of the second lateral side 112 comprises a single second pin forming a primary pin. In an alternative, the inner face 112a of the second lateral side 112 could comprise more than one second pin.

The first lateral arm 121 of the latch 120 comprises a first groove 301 in which the two first pins 201a, 201b are slidably engaged. The first groove 301 defines a first path intended to be followed by the first pins 201a, 201b to guide the latch 120 when the latch 120 is moved between the storage position and the release position.

The first groove 301 comprises a straight part 301b vertically extending when the latch 120 is in the storage position, and a circular part 301a extending along a circular arc. The circular arc has a radius equal to the reference distance d. The first groove 301 further comprises a recess 311 located in the straight part 301b. Alternatively, the first groove 301 can comprise a recess in the circular part 301a.

The second lateral arm 122 of the latch 120 comprises a second groove 302 in which the second pin 202 is slidably engaged. The second groove 302 defines a second path intended to be followed by the second pin 202 to guide the latch 120 when the latch 120 is moved between the storage position and the release position. The second groove 302 is formed by a straight part 302a vertically extending when the latch is in the storage position. Alternatively, the second groove 302 can also comprise a circular part extending along a circular arc. For example, the circular arc can have the same radius as the circular arc along which the circular part of the first groove extends. The second groove 302 further comprises a recess 312 located in the straight part 302a.

The spare wheel carrier 10 further comprises a securing holder 130 having a fastener part 131 attached to the mounting bracket 110, a chain 132 having a first extremity attached to the fastener part 131 and a second extremity opposed to the first extremity 131, and an attachment part 133 attached to the second extremity of the chain 132.

According to an alternative, and without going beyond the scope of the disclosure, the mounting bracket can comprise the first groove and/or the second groove, and the latch can comprise the corresponding first pins and/or the second pins. More precisely, the inner face of the first lateral side of the mounting bracket can comprise the first groove and the inner face of the second lateral side of the mounting bracket can comprise the second groove. In addition, the first lateral arm of the latch can comprise at least one first pin and the second lateral arm of the latch can comprise at least one second pin.

Figure 5:
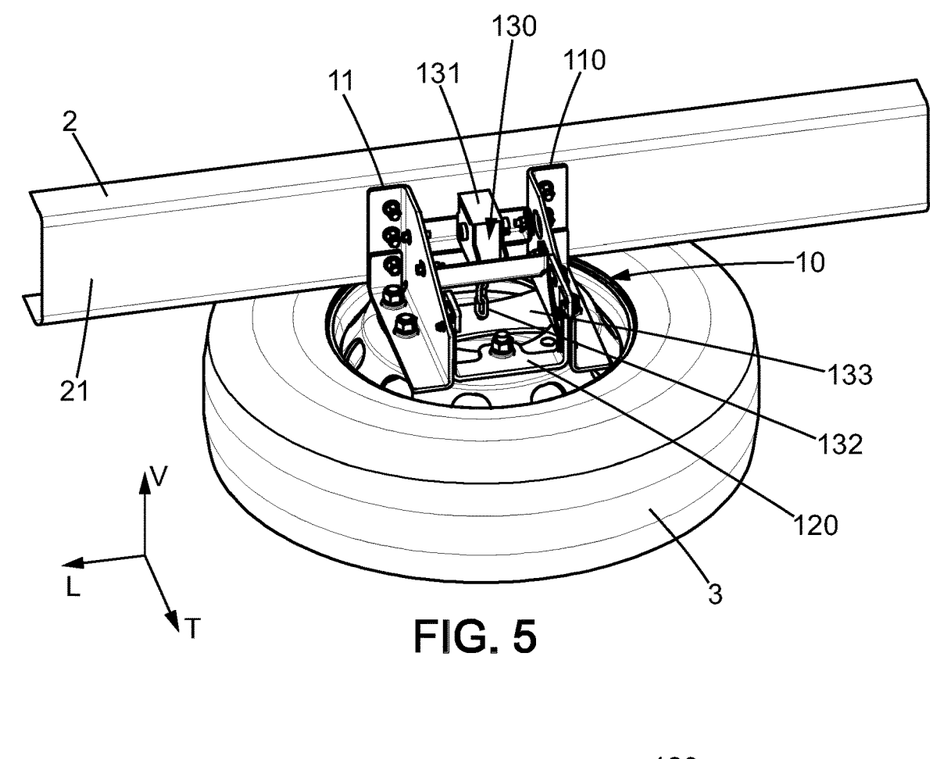
FIG. 5 shows the spare wheel carrier with the latch in a storage position and the spare wheel attached to the latch in the horizontal position.

FIG. 5 shows the spare wheel carrier 10 with the latch 120 in the storage position attached to the chassis 2 of the truck 1.

In the storage position, the spare wheel 3 is attached to both the latch 120 and the mounting bracket 110. Indeed, the spare wheel 3 is attached to the extension 124 of the transversal support of the latch 120 with a screw inserted through the hole 125. Besides, the attachment part 133 is attached to the mounting bracket 110 by enclosing the spare wheel 3 between the attachment part 133 and the mounting bracket 110 to bind the spare wheel 3 to the mounting bracket 110. A series of screws are inserted into the spare wheel rim, the attachment part 133 and the mounting bracket 110 and are attached via a series of bolts 134.

Figure 6:
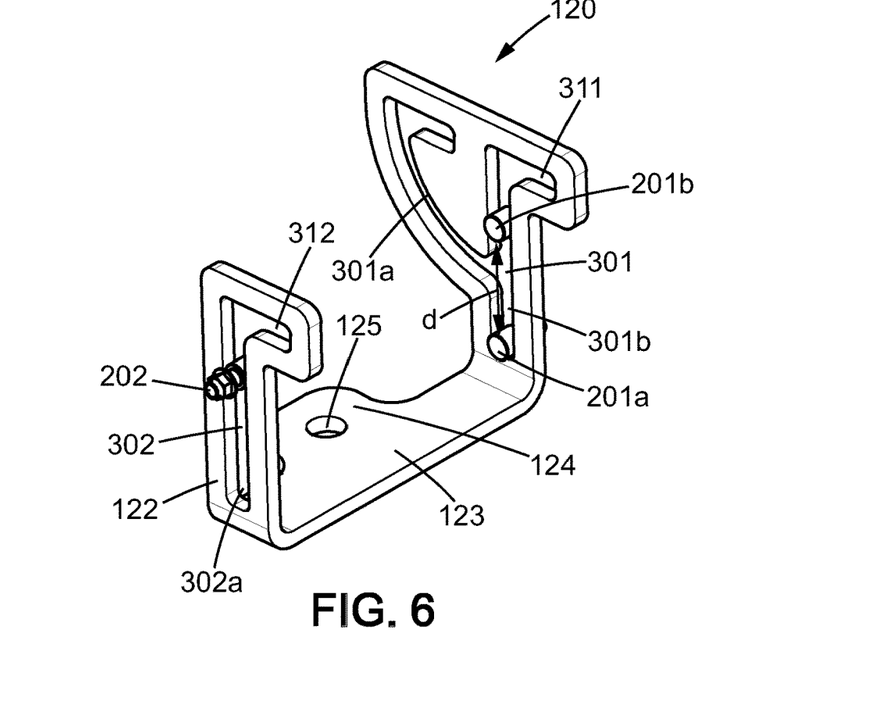
FIG. 6 shows the latch of the spare wheel carrier in the storage position with the pins of the mounting bracket.

Moreover, as shown on FIG. 6, in the storage position of the latch 120, the main pin 201a engages in the straight part 301b of the first groove 301, the additional pin 201b engages in the straight part 301b of the first groove 301 and the primary pin 202 engages in the straight part 302a of the second groove 302.

Figure 7:
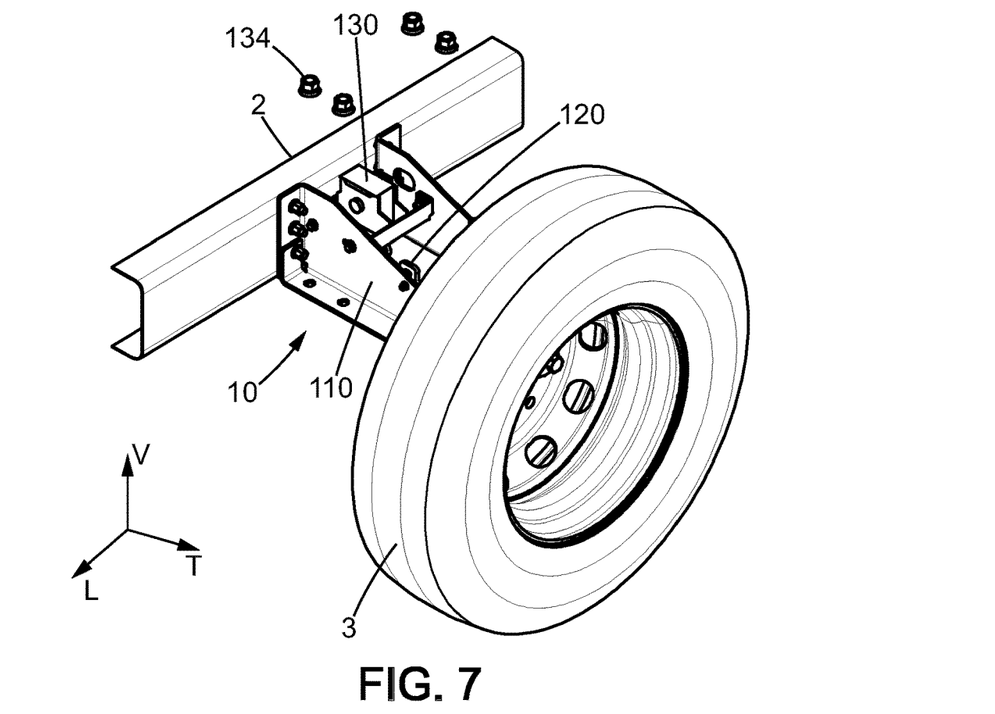
FIG. 7 shows the spare wheel carrier with the latch in a release position and the spare wheel attached to the latch in the vertical position.

FIG. 7 shows the spare wheel carrier 10 with the latch 120 in the release position attached to the chassis 2 of the truck 1.

Figure 8:
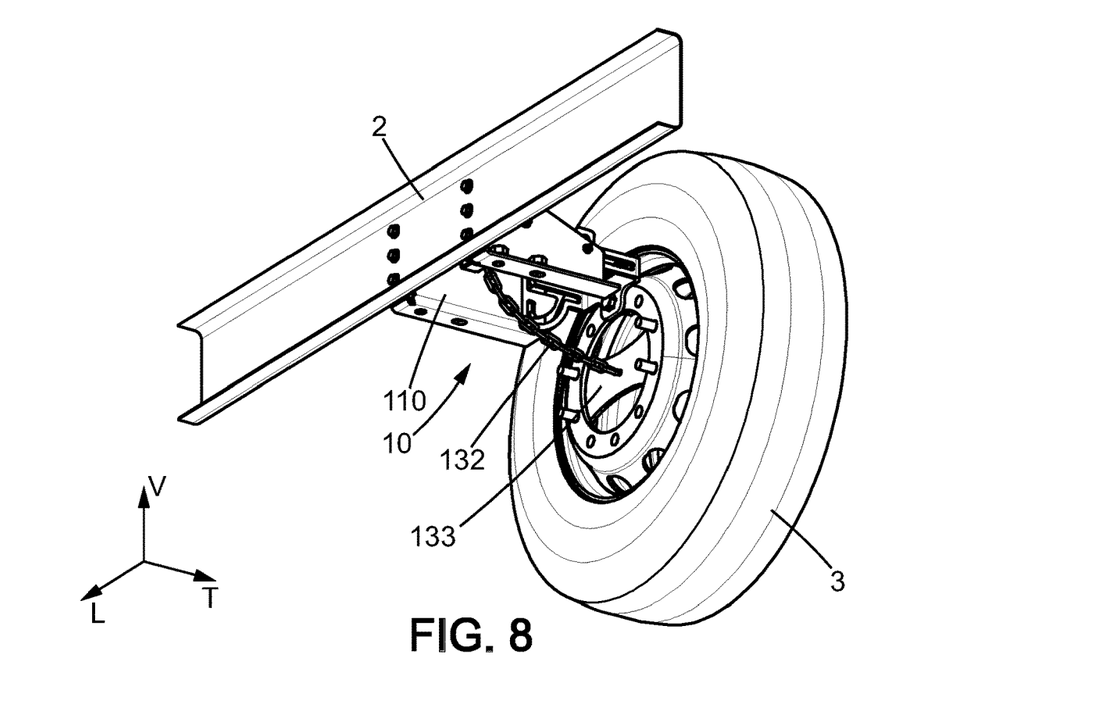
FIG. 8 shows the spare wheel carrier shown on FIG. 7 comprising a securing holder with the attachment part detached from the mounting bracket.

In the release position, the spare wheel 3 is attached only to the latch 120 through the screw inserted through the hole 125 of the extension 124 of the latch 120. The bolts 134 are detached from the mounting bracket 110, and the attachment part 133 is detached from the mounting bracket 110. The spare wheel 3 is thus not bound to the mounting bracket 110.

Figure 9:
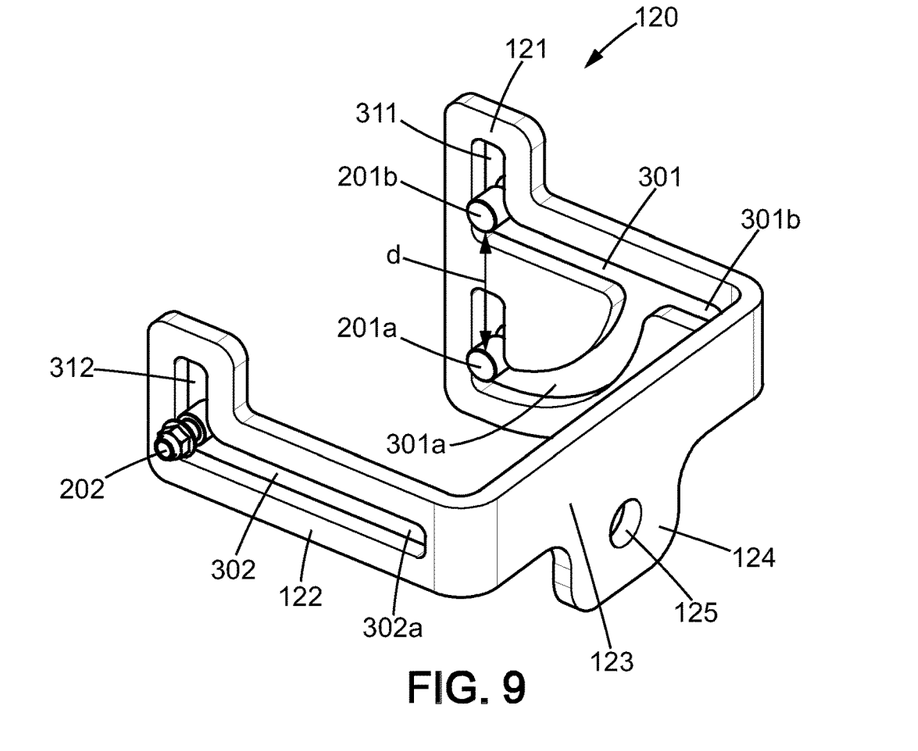
FIG. 9 shows the latch of the spare wheel carrier in the release position with the pins of the mounting bracket.

Moreover, as shown on FIG. 9, in the release position of the latch 120, the main pin 201a engages in the circular part 301a of the first groove 301, the additional pin 201b engages in the straight part 301b of the first groove 301 and the primary pin 202 engages in the straight part 302a of the second groove 302.

The recess 311 of the first groove 301 locks the additional pin 201b, and the recess 312 of the second groove 302 locks the primary pin 202. In the case where the first groove 301 comprises a recess in the circular part 301a, the main pin 201a can be locked by the recess in the circular part 301a.

Between the storage position in which the spare wheel 3 extends in the horizontal plane and the release position in which the spare wheel 3 extends in the vertical plane, the latch 120 is movable with a vertical translation movement relative to the mounting bracket 110 and with a rotation movement relative to the mounting bracket 110. Alternatively, the latch can be movable only with a rotation movement relative to the mounting bracket 110.

When the latch 120 is moved between the storage position and the release position, the latch 120 is moved vertically downwards. The main pins 201a and the additional pin 201b moves in the straight par 301b of the first groove 301, and the primary pin 202 moves in the straight part 302a of the second groove 302.

Then, the main pin 201a engages in the circular part 301a of the first groove 301, and the latched 120 is moved with a rotation movement relative to the mounting bracket 110. The additional pin 201b continue to move in the straight part 301b of the first groove 301, and the primary pin 202 continue to move in the straight part 302a of the second groove 302.

Figure 10:
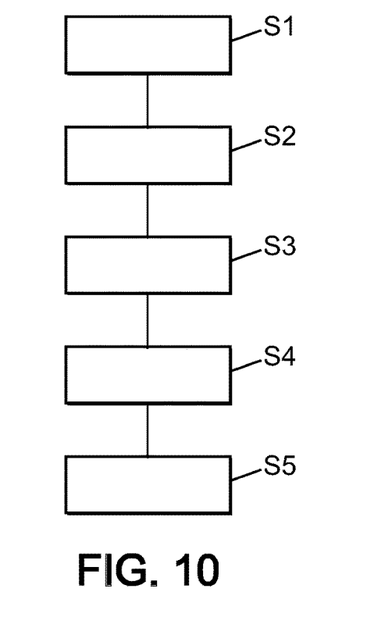
FIG. 10 shows a diagram represented a method to be implemented by an operator for releasing the spare wheel from the truck.

The method to be implemented by an operator for releasing the spare wheel 3 from the truck 1 is shown on FIG. 10. In a first step S1, the operator has to detach the attachment part 133 from the mounting bracket to unbind the spare wheel and the securing part. For detaching the attachment part 133 from the mounting bracket 110, the bolts 134 attaching the attachment part 133 to the mounting bracket 110 are unscrewed.

In a second step S2, the operator has to grab the spare wheel 3 in the horizontal position.

In a third step S3, the operator has to move the latch 120 relative to the mounting bracket 110 from the storage position to the release position. The operator has first to move the latch 120 vertically downwards, and second to move the latched 120 with a rotation movement relative to the mounting bracket 110, so as to swivel the spare wheel 3 from the horizontal position to the vertical position.

In a fourth step S4, the operator has to remove the attachment part 133 from the spare wheel 3. The steel chain 132 is then rolled up.

The operator can then unscrew the screw going through the hole 125 of the transversal support 123 of the latch 120 for detaching the spare wheel 3 from the latch 120. The operator can then release the spare wheel 3 in the vertical position in a fifth step S5.

The invention claimed is:

1. A spare wheel carrier intended to be mounted on a motor vehicle comprising a chassis for storing a spare wheel, the spare wheel carrier comprising:
   a mounting bracket intended to be mounted on the chassis of the motor vehicle; and
   a latch mounted on the mounting bracket, the spare wheel being intended to be attached to the latch;
   wherein the latch is movable, with at least a rotation movement relative to the mounting bracket, between a storage position in which the spare wheel is intended to extend in a horizontal plane, in a horizontal position and a release position in which the spare wheel is intended to extend in a vertical plane perpendicular to the horizontal plane, in a vertical position perpendicular to the horizontal position;
   wherein one of the mounting bracket and the latch comprises at least one first pin and the other one of the mounting bracket and the latch comprises at least one first groove in which the first pin is slidably engaged, the first groove defining a first path intended to be followed by the first pin to guide the latch when the latch is moved between the storage position and the release position;
   wherein the at least one first groove comprises a straight part vertically extending when the latch is in the storage position, and a circular part extending along a circular arc; and
   wherein the at least one first pin comprises a main pin, the main pin being engaged in the straight part of the first groove when the latch is in the storage position, and in the circular part of the first groove when the latch is in the release position.

2. The spare wheel carrier of claim 1, wherein the mounting bracket comprises a planar mounting surface through which the mounting bracket is intended to be mounted on the chassis and extending in an attaching plane, the vertical plane being parallel to the attaching plane.

3. The spare wheel carrier of claim 1, wherein the latch is movable with a vertical translation movement relative to the mounting bracket between the storage position and the release position, the vertical translation movement extending in a plane parallel to the vertical plane.

4. The spare wheel carrier of claim 1, wherein the at least one first groove comprises at least a recess for locking at least one of the at least one first pin when the latch is in the storage position or in the release position.

5. The spare wheel carrier of claim 1, comprising a securing holder comprising:
   a fastener part attached to the mounting bracket;
   a chain comprising a first extremity attached to the fastener part and a second extremity opposed to the first extremity; and
   an attachment part attached to the second extremity of the chain;
   the attachment part being intended to be attached to the mounting bracket by enclosing the spare wheel between the attachment part and the mounting bracket when the latch is in the storage position to bind the spare wheel to the mounting bracket.

6. The spare wheel carrier of claim 1, wherein the at least one first pin comprises an additional pin, the additional pin being engaged in the straight part of the first groove and being arranged to move in the straight part of the first groove when the latch is moved between the storage position and the release position.

7. The spare wheel carrier of claim 6, wherein the main pin and the additional pin are vertically spaced from a reference distance, and the circular arc has a radius equal to the reference distance.

8. The spare wheel carrier of claim 1, wherein the mounting bracket comprises a first lateral side and a second lateral side, the first lateral side and the second lateral side being parallel to each other and each comprising an inner face facing each other;
   wherein the latch is disposed between the inner faces and comprises a first lateral arm, a second lateral arm parallel to each other and a transversal support joining the first lateral arm and the second lateral arm, the first lateral arm facing the inner face of the first lateral side, the second lateral arm facing the inner face of the second lateral side, and the spare wheel being attached to the transversal support;
   wherein one of the inner face of the first lateral side and the first lateral arm comprises the at least one first pin, and the other one of the inner face of the first lateral side and the first lateral arm comprises the at least one first groove; and
   wherein one of the inner face of the second lateral side and the second lateral arm comprises at least one second pin, and the other one of the inner face of the second lateral side and the second lateral arm comprises at least one second groove in which the second pin is slidably engaged, the second groove defining a second path intended to be followed by the second pin to guide the latch when the latch is moved between the storage position and the release position.

9. The spare wheel carrier of claim 8, wherein the at least one second groove is formed by a straight part vertically extending when the latch is in the storage position; and
   wherein the at least one second pin comprises a primary pin, the primary pin being engaged in the straight part of the second groove when the latch is in the storage position and when the latch is in the release position.

10. The spare wheel carrier of claim 8, wherein the transversal support comprises an extension comprising a hole configured to attach the spare wheel.

11. A motor vehicle comprising:
   a chassis;
   a spare wheel; and
   the spare wheel carrier of claim 1,
   wherein the mounting bracket is mounted on the chassis, and the spare wheel is attached to the latch; and
   wherein the spare wheel extends in the horizontal plane, in the horizontal position, when the latch is in the storage position and the spare wheel extends in the vertical plane, in the vertical position, when the latch is in the release position.

12. The motor vehicle of claim 11, wherein the mounting bracket is attached to an external side of the chassis.

13. A method for releasing the spare wheel from the motor vehicle of claim 11, comprising:
   grabbing the spare wheel in the horizontal position;
   rotating the latch relative to the mounting bracket from the storage position to the release position, so as to swivel the spare wheel from the horizontal position to the vertical position; and
   releasing the spare wheel in the vertical position.

14. The method of claim 13, adapted for a motor vehicle comprising a spare wheel carrier, comprising:
   a securing holder comprising:
      a fastener part attached to the mounting bracket;
      a chain comprising a first extremity attached to the fastener part and a second extremity opposed to the first extremity; and
      an attachment part attached to the second extremity of the chain; the attachment part being intended to be attached to the mounting bracket by enclosing the spare wheel between the attachment part and the mounting bracket when the latch is in the storage position to bind the spare wheel to the mounting bracket;
   the method comprising:
      detaching the attachment part from the mounting bracket to unbind the spare wheel and the securing part prior to grab the spare wheel in the horizontal position; and
      removing the attachment part from the spare wheel before releasing the spare wheel.

\* \* \* \* \*